(12) United States Patent
Hellring et al.

(10) Patent No.: US 9,057,835 B2
(45) Date of Patent: Jun. 16, 2015

(54) COATING COMPOSITIONS THAT TRANSMIT INFRARED RADIATION AND EXHIBIT COLOR STABILITY AND RELATED COATING SYSTEMS

(75) Inventors: Stuart D. Hellring, Pittsburgh, PA (US); Stephen G. McQuown, Cheswick, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 905 days.

(21) Appl. No.: 13/153,861

(22) Filed: Jun. 6, 2011

(65) Prior Publication Data

US 2012/0308724 A1 Dec. 6, 2012

(51) Int. Cl.
| | | |
|---|---|---|
| *B05B 5/00* | (2006.01) | |
| *G02B 5/22* | (2006.01) | |
| *C09D 5/02* | (2006.01) | |
| *C09D 5/32* | (2006.01) | |
| *G02B 5/23* | (2006.01) | |
| *C09D 17/00* | (2006.01) | |

(52) U.S. Cl.
CPC ............ *G02B 5/223* (2013.01); *C09D 5/028* (2013.01); *C09D 5/32* (2013.01); *C09D 17/00* (2013.01)

(58) Field of Classification Search
USPC .............. 106/287.2; 136/256; 252/586, 587; 427/160; 428/426, 688; 524/1, 401, 524/439, 441, 500, 505
See application file for complete search history.

(56) References Cited

U.S. PATENT DOCUMENTS

| | | | |
|---|---|---|---|
| 2,294,875 | A | 9/1942 | Hexter et al. |
| 4,311,623 | A | 1/1982 | Supoce |
| 4,546,045 | A | 10/1985 | Elias |
| 5,319,001 | A | 6/1994 | Morgan et al. |
| 5,506,045 | A | 4/1996 | Grochal |
| 5,540,998 | A | 7/1996 | Yamada et al. |
| 5,749,959 | A | 5/1998 | Supcoe |
| 5,939,182 | A | 8/1999 | Huang et al. |
| 5,962,143 | A | 10/1999 | Krauthauser et al. |
| 6,017,981 | A | 1/2000 | Hugo |
| 6,194,484 | B1 | 2/2001 | Hugo |
| 6,294,014 | B1 | 9/2001 | Woodworth et al. |
| 6,296,899 | B1 | 10/2001 | Iizuka |
| 6,306,209 | B1 | 10/2001 | Woodworth et al. |
| 6,336,966 | B1 | 1/2002 | Coca et al. |
| 6,365,666 | B1 | 4/2002 | McCollum et al. |
| 6,366,397 | B1 | 4/2002 | Genjima et al. |
| 6,376,597 | B1 | 4/2002 | Coca et al. |
| 6,399,228 | B1 | 6/2002 | Simpson |
| 6,441,066 | B1 | 8/2002 | Woodworth et al. |
| 6,462,125 | B1 | 10/2002 | White et al. |
| 6,521,038 | B2 | 2/2003 | Yanagimoto et al. |
| 6,590,049 | B1 | 7/2003 | O'Dwyer et al. |
| 6,623,556 | B2 | 9/2003 | Zama |
| 6,642,301 | B2 | 11/2003 | White et al. |
| 6,875,800 | B2 | 4/2005 | Vanier et al. |
| 7,137,713 | B2 | 11/2006 | Harasawa et al. |
| 7,157,112 | B2 | 1/2007 | Haines |
| 7,211,324 | B2 | 5/2007 | Kamimori |
| 2001/0044489 | A1 | 11/2001 | Hugo |
| 2002/0188051 | A1 | 12/2002 | Hugo |
| 2004/0018360 | A1 | 1/2004 | Hugo |
| 2004/0068046 | A1 | 4/2004 | Hugo |
| 2004/0142205 | A1 | 7/2004 | Chen et al. |
| 2004/0191540 | A1 | 9/2004 | Jakobi et al. |
| 2005/0129871 | A1 | 6/2005 | Ruther et al. |
| 2005/0129964 | A1 | 6/2005 | Hugo |
| 2005/0170171 | A1 | 8/2005 | Vanier |
| 2005/0215685 | A1 | 9/2005 | Haines |
| 2005/0287348 | A1 | 12/2005 | Faler et al. |
| 2006/0229407 | A1 | 10/2006 | Vogel et al. |
| 2006/0251895 | A1 | 11/2006 | Lambert et al. |
| 2007/0087199 | A1 | 4/2007 | Yoshimura et al. |
| 2008/0102270 | A1 | 5/2008 | Shiao et al. |
| 2008/0187708 | A1 | 8/2008 | Decker et al. |
| 2008/0188610 | A1* | 8/2008 | Polk et al. .............. 524/539 |
| 2010/0047620 | A1* | 2/2010 | Decker et al. ........... 428/688 |

FOREIGN PATENT DOCUMENTS

| | | |
|---|---|---|
| DE | 4035062 A1 | 5/1992 |
| DE | 4419748 C2 | 5/1999 |
| DE | 10248234 B3 | 2/2004 |
| EP | 0218436 | 4/1987 |
| EP | 0361327 A1 | 4/1990 |
| EP | 0246342 B1 | 7/1991 |
| EP | 1817383 B1 | 2/2009 |
| FR | 2538756 | 7/1984 |
| GB | 2420995 A | 6/2006 |
| JP | 55074862 | 6/1980 |

(Continued)

OTHER PUBLICATIONS

Spinelli, Harry J., Group transfer polymerization and its use in water based pigment dispersants and emulsion stabilizers, Progress in Organic Coatings 27, (1966), 255-260, Elsevier Science S.A.
Wake, L.V., The effect of pigments in formulating solar reflecting and infrared emitting coatings for military applications, (1990), 78-80, Horizons.
Military Specification, MIL-C-46127A(MR), (Apr. 26, 1977), Coating, Gray, Undercoat (Solar Heat Reflecting), 1-16.
Military Specification, MIL-E-46136A(MR), (Sep. 7, 1971), Enamel, Semi-Gloss, Alkyd, Solar Heat Reflecting, Olive Drab, 1-28.
Military Specification, MIL-E-46117(MR), (Dec. 29, 1967), Enamel, Alkyd, Lustreless, Solar Heat Reflecting, Olive Drab, 1-15.
Military Specification, MIL-E-46117A(MR), (Oct. 6, 1970), Enamel, Alkyd, Lustreless, Solar Heat Reflecting, Olive Drab, 1-25.
Military Specification, MIL-E-460968(MR), Amendment 1, (Dec. 8, 1969), Enamel, Lustreless, Quick Drying, Styrenated Alkyd Type, Solar Heat Reflecting, Olive Drab, 1-30.

(Continued)

*Primary Examiner* — Bijan Ahvazi
(74) *Attorney, Agent, or Firm* — Julie W. Meder

(57) ABSTRACT

A coating composition suitable for producing coatings that are transparent to infrared radiation and can exhibit color stability, such as a jet black color. The coating compositions include a first tint having a low haze and a second tint having a high haze. The tints include visibly absorbing infrared transparent pigments.

18 Claims, No Drawings

(56) References Cited

FOREIGN PATENT DOCUMENTS

| | | |
|---|---|---|
| JP | 42-464478 | 9/1992 |
| JP | 2004-246478 | 9/1992 |
| JP | 05293434 | 11/1993 |
| JP | 2000-279881 | 10/2000 |
| JP | 2001-240767 | 9/2001 |
| JP | 2002-060698 | 2/2002 |
| JP | 2005-000821 | 1/2005 |
| JP | 2006-289247 | 10/2006 |
| WO | WO 9618858 | 6/1996 |
| WO | WO 02/14445 A1 | 3/2001 |
| WO | WO 2004/090030 A1 | 10/2004 |
| WO | WO 2005/095528 A2 | 10/2005 |
| WO | WO 2006/058782 A1 | 6/2006 |
| WO | WO 2009/045981 A2 | 4/2009 |
| WO | WO 2009/048515 A1 | 4/2009 |
| WO | WO 2012/051264 A1 | 4/2012 |
| WO | WO 2012/061209 A1 | 5/2012 |

OTHER PUBLICATIONS

Pickett, Charles F., Solar Heat Reflecting Coatings, Society of Automotive Engineers, International Automotive Engineering Congress, Detroit, Mich., (Jan. 13-17, 1969), 1-5.

Brady, Robert F. and Wake, Lindsay V., Principles and formulations for organic coatings with tailored infrared properties, Progress in Organic Coatings, 20, (1992), 1-25, Elsevier Sequoia.

* cited by examiner

COATING COMPOSITIONS THAT TRANSMIT INFRARED RADIATION AND EXHIBIT COLOR STABILITY AND RELATED COATING SYSTEMS

FIELD OF THE INVENTION

The present invention relates generally to coating compositions that transmit infrared radiation and exhibit color stability. The invention also relates to cured coatings deposited on a substrate, as well as methods of using the coating compositions.

BACKGROUND INFORMATION

For many coating applications such as automotive coatings, aerospace coatings, industrial coatings and architectural coatings, dark colors, such as black and dark blue are particularly desirable for aesthetic purposes. However, dark colored coatings have historically been susceptible to absorption of near-infrared radiation because they often rely on the use of pigments, such as carbon black, that absorb near-infrared radiation in addition to visible radiation. Near-infrared radiation, i.e., light energy having a wavelength of from 700 to 2500 nanometers, constitutes over 50% of the solar energy that reaches the earth's surface. Heat is a direct consequence of the absorption of near-infrared radiation. As a result, dark colored coatings have historically been susceptible to substantially increased temperatures, particularly on sunny days, which is often undesirable for many reasons. Thus, solar heat (near-infrared) reflecting coatings have been desired.

In *Principles and formulations for organic coatings with tailored infrared properties, Progress in Organic Coatings*, 20:1-25 (1992) ("Brady") formulation approaches for achieving solar heat reflecting coatings are described. In one approach, a two layer coating system is employed in which an upper layer is colored with pigments that absorb visible radiation but are transparent to near-infrared radiation, such as organic black pigments (perylene blacks are mentioned) or other organic pigments (phthalocyanine blues and greens and carbazole dioxazine violet are identified), and an underlayer, such as a highly reflective white undercoat, that reflects near-infrared radiation, reduces the temperature increase of the coating system. An example of such a coating system is also described in United States Patent Application Publication No. 2004/0191540 A1.

There are certain drawbacks associated with prior versions of such coating systems. One drawback has been difficulty in achieving coatings that exhibit a jet black color. This is because the infrared transparent organic pigments used in the upper layer have a tendency to scatter light compared to the infrared-absorbing carbon black pigment. This problem is exacerbated in thin film areas and coating edges, where the coating may not appear black at all. Another drawback has been the inability to achieve such coating systems that exhibit color "stability" in which the color of the coating does not change appreciably after exposure to weathering conditions.

As a result, it would desirable to provide coating compositions that can produce coatings that are transparent to infrared radiation and can exhibit a "stable" color, such as a jet black, even in thin film areas and coating edges. It would also be desirable to provide coating systems that include coatings deposited from such compositions.

SUMMARY OF THE INVENTION

In certain respects, the present invention is directed to coating compositions. These coating compositions comprise: (a) film-forming resinous binder; (b) a first visibly absorbing infrared transparent pigment; and (c) a second visibly absorbing infrared transparent pigment different from the first visibly absorbing infrared transparent pigment. A cured coating deposited from such coating compositions (i) has a jetness of at least 240, and (ii) exhibits a color change of no more than 1ΔE unit after 3000 hours of QUV durability testing.

In other respects, the present invention is directed to coating compositions that comprise: (a) a tint having a haze of no more than 5% and comprising a first visibly absorbing infrared transparent pigment; and (b) a pigment dispersion comprising a second visibly absorbing infrared transparent pigment different from the first visibly absorbing infrared transparent pigment.

The present invention is also directed to, for example, methods for using such coating compositions and related coated substrates.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As indicated, certain embodiments of the present invention are directed to coating compositions comprising a film-forming resinous binder. As used herein, the term "film-forming resinous binder" refers to resins that can form a self-supporting continuous film on at least a horizontal surface of a substrate upon removal of any diluents or carriers present in the composition or upon curing at ambient or elevated temperature.

Film-forming resins that may be used in the present invention include, without limitation, those used in automotive OEM coating compositions, automotive refinish coating compositions, industrial coating compositions, architectural coating compositions, coil coating compositions, packaging coating compositions, protective and marine coating compositions, and aerospace coating compositions, among others.

In certain embodiments, the film-forming resinous binder included within the coating compositions described herein comprises a thermosetting film-forming resin. As used herein, the term "thermosetting" refers to resins that "set" irreversibly upon curing or crosslinking, wherein the polymer chains of the polymeric components are joined together by covalent bonds. This property is usually associated with a cross-linking reaction of the composition constituents often induced, for example, by heat or radiation. See Hawley, Gessner G., The Condensed Chemical Dictionary, Ninth Edition., page 856; Surface Coatings, vol. 2, Oil and Colour Chemists' Association, Australia, TAPE Educational Books (1974). Curing or crosslinking reactions also may be carried out under ambient conditions. Once cured or crosslinked, a thermosetting resin will not melt upon the application of heat and is insoluble in solvents. In other embodiments, the film-forming resin included within the coating compositions described herein comprises a thermoplastic resin. As used herein, the term "thermoplastic" refers to resins that comprise polymeric components that are not joined by covalent bonds and thereby can undergo liquid flow upon heating and are soluble in solvents. See Saunders, K. J., Organic Polymer Chemistry, pp. 41-42, Chapman and Hall, London (1973). As used herein, "polymer" or "resin" refers broadly to prepolymers, oligomers and both homopolymers and copolymers. The prefix "poly" as used herein refers to two or more.

The coating composition(s) may be water-based or solvent-based liquid compositions, or, alternatively, in solid particulate form, i.e., a powder coating.

Thermosetting coating compositions typically comprise a crosslinking agent that may be selected from, for example, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing.

In addition to or in lieu of the above-described crosslinking agents, thermosetting compositions typically comprise at least one film-forming resin having functional groups that are reactive with the crosslinking agent. The film-forming resin can be selected from, for example, acrylic polymers, polyester polymers, polyurethane polymers, polyamide polymers, polyether polymers, polysiloxane polymers, copolymers thereof, and mixtures thereof. Such polymers may be solvent borne or water dispersible, emulsifiable, or of limited water solubility. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups), mercaptan groups, and combinations thereof.

The coating compositions of the present invention also comprise visibly absorbing infrared transparent pigments. More particularly, the coating compositions of the present invention comprise at least two different visibly absorbing infrared transparent pigments, which are referred to herein as a "first" visibly absorbing infrared transparent pigment and a "second" visibly absorbing infrared transparent pigment.

As used herein, the term "infrared transparent pigment" refers to a pigment that is substantially transparent in the near-infrared wavelength region (700 to 2500 nanometers), such as is described in United States Patent Application Publication No. 2004/0191540 at [0020]-[0026], the cited portion of which being incorporated herein by reference, without appreciable scattering or absorption of radiation in such wavelengths. In certain embodiments, the infrared transparent pigment has an average transmission of at least 70% in the near-infrared wavelength region. The infrared transparent pigments present in the coating compositions of the present invention are also visibly absorbing. As used herein, the term "visible absorbing" refers to a pigment that substantially absorbs radiation in at least some wavelengths within the visible region of 400 to 700 nanometers. In some cases, such visible absorbing pigment has at least 70%, such as at least 80%, of its total absorbance in the visible spectrum in the range of 400 to 500 nanometers. In some cases, the visible absorbing pigment has at least 70%, such as at least 75%, of its total absorbance in the visible spectrum in the range of 500 to 600 nanometers. In some cases, the visible absorbing pigment has at least 60%, such as at least 70%, of its total absorbance in the visible spectrum in the range of 600 to 700 nanometers.

Non-limiting examples of suitable visibly absorbing infrared transparent pigments include, for example, copper phthalocyanine pigment, halogenated copper phthalocyanine pigment, anthraquinone pigment, quinacridone pigment, perylene pigment, monoazo pigment, disazo pigment, quinophthalone pigment, indanthrone pigment, dioxazine pigment, transparent iron oxide brown pigment, transparent iron oxide red pigment, transparent iron oxide yellow pigment, cadmium orange pigment, ultramarine blue pigment, cadmium yellow pigment, chrome yellow pigment, cobalt aluminate blue pigment, isoindoline pigment, diarylide yellow pigment, brominated anthranthron pigment and the like.

In certain embodiments, the coating compositions of the present invention comprise visibly absorbing infrared transparent pigments that have a % of reflectance that increases at wavelengths of from 750 to 850 nanometers along the electromagnetic spectrum, such as is described in the aforementioned United States Patent Application Publication No. 2004/0191540. In some cases, the coating compositions comprises a visibly absorbing infrared transparent pigment that has a % of reflectance that ranges from at least 10% at a wavelength of 750 nanometers along the electromagnetic spectrum to at least 90% at a wavelength of 900 nanometers.

In certain embodiments, the coating compositions of the present invention comprise two or more different visibly absorbing infrared transparent black pigments, such as two or more different visibly absorbing infrared transparent pigments that rely in part upon a perylene type structure, that is illustrated below

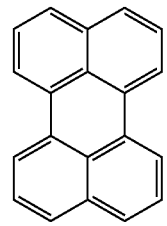 [SMILES: c1cc2cccc3c4cccc5cccc(c(c1)c23)c54]

Commercially available examples of such pigments include, Lumogen® Black FK 4280 pigment from BASF Corporation, Southfield, Mich., Paliogen® Black L0086, from BASF, which has a Colour Index of "Pigment Black 32" (Part 1) and "71133" (Part 2), as well as Paliogen® Black S0084, which has Colour Index of "Pigment Black 31" (Part 1) and "71132" (Part 2). Further examples of infrared transparent black pigments that are suitable for use in certain embodiments of the present invention are described in United States Patent Application Publication No. 2009/0098476 A1 at [0030] to [0034], the cited portion of which being incorporated by reference herein.

In some embodiments, the coating composition comprises a perylene pigment according to formulae (a) or (b):

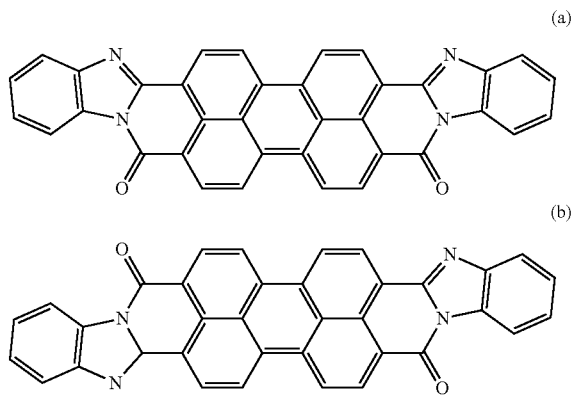

(a)

(b)

Such pigments are commercially available as Paliogen® Black EH 0788 and Lumogen® Black FK4280 from BASF Corporation.

In certain embodiments, the coating composition also comprises a perylene pigment according to formula (c):

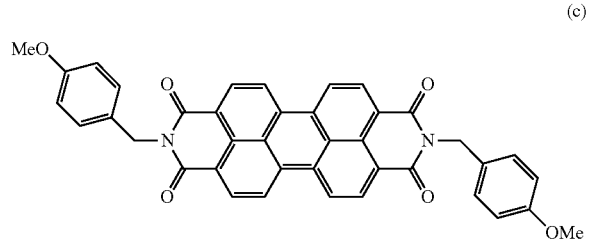

(c)

Such perylene pigment is also known as "CI Pigment Black 32" and is commercially available as Paliogen® Black L 0086 from BASF Corporation.

In certain embodiments of the present invention, the first visibly absorbing infrared transparent pigment is incorporated into the coating composition via a tint. As used herein, "tint" refers to a composition of pigment in a dispersant, which may be a resinous (polymeric) material compatible with solvent based resinous binders or which may be compatible with aqueous coating systems.

More particularly, certain embodiments of the coating compositions of the present invention comprise one or more tints having a haze of no more than 5%, such as no more than 3%, no more than 2%, or, in some cases, no more than 1%, and comprising a visibly absorbing infrared transparent pigment. As will be appreciated, haze is a measurement of the transparency of a material and is defined by ASTM D 1003. The haze values described herein are determined using an X-Rite 8400 spectrophotometer in transmittance mode with a 500 micron path-length cell on pigments dispersed in a suitable solvent such as n-butyl acetate. Because the percent haze of a liquid sample is concentration dependent (and therefore on the transmittance of light through the liquid), the percent haze is described herein at a transmittance of about 15% to about 20% (such as at 17.5%) at the wavelength of maximum absorbance.

In certain embodiments, the low haze tint comprises a black pigment, such as one or more of the perylene based pigments described above. In other embodiments, the coating composition comprises a low haze tint comprising a visibly absorbing infrared transparent pigment that is not black. For example, in some embodiments, the coating composition comprises a low haze tint comprising a combination of infrared transparent pigments that, when used in combination, can produce a jet black color even in the absence of a black pigment. In some embodiments, the coating composition comprises a combination of low haze tints, none of which exhibit a black color, but, when used in combination can produce a jet black color. For example, in some embodiments, the coating composition comprises a low haze tint comprising a combination of red, yellow and blue pigments. In some embodiments, the coating composition comprises a combination of low haze tints, one of which being yellow in color, one of which being blue in color, and one of which being red in color. Other optional colors include purple and green. Non-limiting examples of suitable pigments for use in these embodiments include Pigment Yellow 138, Pigment Yellow 139, Pigment Red 179, Pigment Red 202, Pigment Violet 29, Pigment Blue 15:3 and Pigment Green 36.

The tint having low haze often contains nano-sized visibly absorbing infrared transparent pigments. Furthermore, such tints are often substantially free of visibly absorbing infrared transparent pigments that are not nano-sized. By "nano-sized" is meant that the pigment has an average primary particle size of no more than 100 nanometers. By "substantially free" is meant that no more than 10% by weight, such as no more than 5% by weight, or, in some cases, no more than 1% by weight, of the visibly absorbing infrared transparent pigments present in the first tint are not nano-sized. Such tints may be prepared by milling bulk organic pigments with milling media having a particle size of less than about 0.5 mm, such as less than 0.3 mm and, in some cases, about 0.1 mm or smaller. The tints containing pigment particles are milled to reduce the pigment primary particle size to nanoparticulate sizes in a high energy mill in an organic solvent system, such as butyl acetate using a pigment dispersant (such as is described below), with an optional polymeric grinding resin. As a result, in these embodiments, the tint having low haze comprises a visibly absorbing infrared transparent pigment having an average primary particle size of no more than 100 nanometers, such as no more than 50 nanometers or no more than 30 nanometers, such as is described in United States Patent Application Publication No. 2008-0187708 A1 at [0013] to [0022], the cited portion of which being incorporated herein by reference.

As indicated earlier, the tint also comprises a dispersant. Suitable dispersants include acrylic copolymers produced by atom transfer radical polymerization and having a head portion and a tail portion in which the head portion exhibits affinity for pigments (such as aromatic groups), and the tail portion is compatible with resinous binders of coating compositions (such as acrylic groups), with the polymer having a weight average molecular weight of 1,000 to 20,000. For example, the dispersant may include a block copolymer having a first block comprising an oxirane functional monomer reacted with a polycyclic aromatic carboxylic acid and one or more additional blocks comprising (meth)acrylic acid alkyl esters. In one embodiment, the first block includes a glycidyl (meth)acrylate reacted with a napthoic acid and second and third blocks that are different from each other, each including (meth)acrylic acid alkyl esters.

Such dispersants can have a polymer chain structure represented by the following general formula (I),

$$\Phi\text{-}(G)_p\text{-}(W)_q\text{-}(Y)_s T \tag{I}$$

wherein G is a residue of at least one radically polymerizable ethylenically unsaturated monomer; W and Y are residues of at least one radically polymerizable ethylenically unsaturated monomer; with W and Y being different from one another; Φ is a hydrophobic residue of or derived from an initiator, and is free of the radically transferable group; T is or is derived from the radically transferable group of the initiator; p, q and s represent average numbers of residues occurring in a block of residues; p, q and s are each individually selected such that the pigment dispersant has a number average molecular weight of at least 250.

The pigment dispersant described above may be described generally as having a head and tail structure, i.e., as having a polymeric head portion and a polymeric tail portion. The polymeric tail portion may have a hydrophilic portion and a hydrophobic portion, particularly at the terminus thereof. As used herein and in the claims, the terms "hydrophobic" and "hydrophilic" are relative to each other.

Such a pigment dispersant can be prepared by atom transfer radical polymerization (ATRP). The ATRP process can be described generally as comprising: polymerizing one or more radically polymerizable monomers in the presence of an initiation system; forming a polymer; and isolating the formed polymer. In certain embodiments, the initiation system comprises: a monomeric initiator having a single radically transferable atom or group; a transition metal compound, i.e., a catalyst, which participates in a reversible redox cycle with the initiator; and a ligand, which coordinates with the transition metal compound. The ATRP process is described in further detail in International Patent Publication No. WO 98/40415 and U.S. Pat. Nos. 5,807,937, 5,763,548 and 5,789,487.

Catalysts that may be used in the ATRP preparation of the pigment dispersant include any transition metal compound that can participate in a redox cycle with the initiator and the growing polymer chain. It may be preferred that the transition metal compound not form direct carbon-metal bonds with the polymer chain. Transition metal catalysts useful in the present invention may be represented by the following general formula (II),

$$M^{n+}X_n \tag{II}$$

wherein M is the transition metal, n is the formal charge on the transition metal having a value of from 0 to 7, and X is a counterion or covalently bonded component. Examples of the transition metal M include, but are not limited to, Cu, Fe, Au, Ag, Hg, Pd, Pt, Co, Mn, Ru, Mo, Nb and Zn. Examples of X include, but are not limited to, halide, hydroxy, oxygen, $C_1$-$C_6$-alkoxy, cyano, cyanato, thiocyanato and azido. In one specific example, the transition metal is Cu(I) and X is halide, for example, chloride. Accordingly, one specific class of transition metal catalysts is the copper halides, for example, Cu(I)Cl. It may also be preferred that the transition metal catalyst contain a small amount, for example, 1 mole percent, of a redox conjugate, for example, $Cu(II)Cl_2$ when Cu(I)Cl is used. Additional catalysts useful in preparing the pigment dispersant are described in U.S. Pat. No. 5,807,937 at column 18, lines 29 through 56. Redox conjugates are described in further detail in U.S. Pat. No. 5,807,937 at column 11, line 1 through column 13, line 38.

Ligands that may be used in the ATRP preparation of the pigment dispersant include, but are not limited to, compounds having one or more nitrogen, oxygen, phosphorus and/or sulfur atoms, which can coordinate to the transition metal catalyst compound, for example, through sigma and/or pi bonds. Classes of useful ligands include, but are not limited to, unsubstituted and substituted pyridines and bipyridines; porphyrins; cryptands; crown ethers; for example, 18-crown-6; polyamines, for example, ethylenediamine; glycols, for example, alkylene glycols, such as ethylene glycol; carbon monoxide; and coordinating monomers, for example, styrene, acrylonitrile and hydroxyalkyl (meth)acrylates. As used herein, the term "(meth)acrylate" and similar terms refer to acrylates, methacrylates and mixtures of acrylates and methacrylates. One specific class of ligands are the substituted bipyridines, for example, 4,4'-dialkyl-bipyridyls. Additional ligands that may be used in preparing pigment dispersant are described in U.S. Pat. No. 5,807,937 at column 18, line 57 through column 21, line 43.

Classes of monomeric initiators that may be used in the ATRP preparation of the pigment dispersant include, but are not limited to, aliphatic compounds, cycloaliphatic compounds, aromatic compounds, polycyclic aromatic compounds, heterocyclic compounds, sulfonyl compounds, sulfenyl compounds, esters of carboxylic acids, nitriles, ketones, phosphonates and mixtures thereof, each having a radically transferable group, and preferably a single radically transferable group. The radically transferable group of the monomeric initiator may be selected from, for example, cyano, cyanato, thiocyanato, azido and halide groups. The monomeric initiator may also be substituted with functional groups, for example, oxyranyl groups, such as glycidyl groups. Additional useful initiators are described in U.S. Pat. No. 5,807,937 at column 17, line 4 through column 18, line 28.

In certain embodiments, the monomeric initiator is selected from 1-halo-2,3-epoxypropane, p-toluenesulfonyl halide, p-toluenesulfenyl halide, $C_6$-$C_{20}$-alkyl ester of alpha-halo-$C_2$-$C_6$-carboxylic acid, halomethylbenzene, (1-haloethyl)benzene, halomethylnaphthalene, halomethylanthracene and mixtures thereof. Examples of $C_2$-$C_6$-alkyl ester of alpha-halo-$C_2$-$C_6$-carboxylic acids include, hexyl alpha-bromopropionate, 2-ethylhexyl alpha-bromopropionate, 2-ethylhexyl alpha-bromohexionate and icosanyl alpha-bromopropionate. As used herein, the term "monomeric initiator" is meant to be distinguishable from polymeric initiators, such as polyethers, polyurethanes, polyesters and acrylic polymers having radically transferable groups.

In the ATRP preparation, the pigment dispersant, the amounts and relative proportions of monomeric initiator, transition metal compound and ligand are those for which ATRP is most effectively performed. The amount of initiator used can vary widely and is typically present in the reaction medium in a concentration of from $10^{-4}$ moles/liter (M) to 3 M, for example, from $10^{-3}$ M to $10^{-1}$ M. As the molecular weight of the pigment dispersant can be directly related to the relative concentrations of initiator and monomer(s), the molar ratio of initiator to monomer is an important factor in polymer preparation. The molar ratio of initiator to monomer is typically within the range of $10^{-4}$:1 to 0.5:1, for example, $10^{-3}$:1 to $5 \times 10^{-2}$:1.

In preparing the pigment dispersant by ATRP methods, the molar ratio of transition metal compound to initiator is typically in the range of $10^{-4}$:1 to 10:1, for example, 0.1:1 to 5:1. The molar ratio of ligand to transition metal compound is typically within the range of 0.1:1 to 100:1, for example, 0.2:1 to 10:1.

The pigment dispersant may be prepared in the absence of solvent, i.e., by means of a bulk polymerization process. Often, the pigment dispersant is prepared in the presence of a solvent, typically water and/or an organic solvent. Classes of useful organic solvents include, but are not limited to, esters of carboxylic acids, ethers, cyclic ethers, $C_5$-$C_{10}$ alkanes, $C_5$-$C_8$ cycloalkanes, aromatic hydrocarbon solvents, halogenated hydrocarbon solvents, amides, nitriles, sulfoxides, sulfones and mixtures thereof. Supercritical solvents, such as $CO_2$, $C_1$-$C_4$ alkanes and fluorocarbons, may also be employed. One class of solvents is the aromatic hydrocarbon solvents, such as xylene, toluene, and mixed aromatic solvents such as those commercially available from Exxon Chemical America under the trademark SOLVESSO. Additional solvents are described in further detail in U.S. Pat. No. 5,807,937, at column 21, line 44 through column 22, line 54.

The ATRP preparation of the pigment dispersant is typically conducted at a reaction temperature within the range of 25° C. to 140° C., for example, from 50° C. to 100° C., and a pressure within the range of 1 to 100 atmospheres, usually at ambient pressure.

The ATRP transition metal catalyst and its associated ligand are typically separated or removed from the pigment dispersant prior to its use in the pigment dispersants of the present invention. Removal of the ATRP catalyst may be achieved using known methods, including, for example, adding a catalyst binding agent to the mixture of the pigment dispersant, solvent and catalyst, followed by filtering. Examples of suitable catalyst binding agents include, for example, alumina, silica, clay or a combination thereof. A mixture of the pigment dispersant, solvent and ATRP catalyst may be passed through a bed of catalyst binding agent. Alternatively, the ATRP catalyst may be oxidized in situ, the oxidized residue of the catalyst being retained in the pigment dispersant.

With reference to general formula (I), G may be a residue of at least one radically polymerizable ethylenically unsaturated monomer, such as a monomer selected from an oxirane functional monomer reacted with a carboxylic acid which may be an aromatic carboxylic acid or polycyclic aromatic carboxylic acid, including, for example, phenyl (meth)acrylate, p-nitrophenyl (meth)acrylate and benzyl (meth)acrylate; polycyclicaromatic (meth)acrylates, for example, 2-naphthyl (meth)acrylate; N-(aryl)maleimide; and mixtures thereof.

The oxirane functional monomer or its residue that is reacted with a carboxylic acid may be selected from, for example, glycidyl (meth)acrylate, 3,4-epoxycyclohexylmethyl(meth)acrylate, 2-(3,4-epoxycyclohexyl)ethyl(meth) acrylate, allyl glycidyl ether and mixtures thereof. Examples of carboxylic acids that may be reacted with the oxirane functional monomer or its residue include, but are not limited to, napthoic acid, hydroxy napthoic acids, para-nitrobenzoic acid and mixtures thereof.

With continued reference to general formula (I), W and Y may each be residues of monomers independently selected from, for example, (meth)acrylic acid, (meth)acrylates, and hydroxy-functional (meth)acrylates. Examples of $C_1$-$C_{20}$ alkyl (meth)acrylates (including linear or branched alkyls and cycloalkyls) of which W and Y may each independently be residues of, include, but are not limited to, methyl (meth) acrylate, ethyl (meth)acrylate, propyl (meth)acrylate, isopropyl (meth)acrylate, n-butyl(meth)acrylate, iso-butyl (meth) acrylate, tert-butyl (meth)acrylate, 2-ethylhexyl (meth) acrylate, lauryl (meth)acrylate, isobornyl (meth)acrylate, cyclohexyl (meth)acrylate, 3,3,5-trimethylcyclohexyl (meth) acrylate and isocane (meth)acrylate.

Hydroxy alkyl (meth)acrylates having from 2 to 4 carbon atoms in the alkyl group of which W and Y may each independently be residues of include, but are not limited to, hydroxyethyl (meth)acrylate, hydroxypropyl (meth)acrylate, hydroxybutyl (meth)acrylate, and butyl (meth)acrylate. In general formula (I), W and Y may each independently be residues of monomers having more than one (meth)acryloyl group, such as (meth)acrylic anhydride, diethyleneglycol bis (meth)acrylate, 4,4'-isopropylidenediphenol bis(meth)acrylate (Bisphenol A di(meth)acrylate), alkoxylated 4,4'-isopropylidenediphenol bis(meth)acrylate, trimethylolpropane tris (meth)acrylate and alkoxylated trimethylolpropane tris (meth)acrylate.

The numerals p, q and s represent the average total number of G, W and Y residues, respectively, occurring per block or segment of G residues (G-block or G-segment), W residues (W-block or W-segment) and Y residues (Y-block G or Y-segment), respectively. When containing more than one type or species of monomer residue, the W- and Y-blocks may each have at least one of random block (e.g., di-block and tri-block), alternating, and gradient architectures. Gradient architecture refers to a sequence of different monomer residues that change gradually in a systematic and predictable manner along the polymer backbone. For purposes of illustration, a W-block containing 6 residues of butyl methacrylate (BMA) and 6 residues of hydroxy propyl methacrylate (HPMA), for which q is 12, may have di-block, tetra-block, alternating and gradient architectures as described in U.S. Pat. No. 6,642,301, col. 10, lines 5-25. In certain embodiments, the G-block may include about 5-15 residues of glycidyl(meth)acrylate reacted with an aromatic carboxylic acid (such as 3-hydroxy-2-napthoic acid), the W-block may be a random block of about 20-30 BMA and HPMA residues and the Y-block may be a uniform block of about 5-15 butyl acrylate (BA) residues.

The order in which monomer residues occur along the polymer backbone of the pigment dispersant is typically determined by the order in which the corresponding monomers are fed into the vessel in which the controlled radical polymerization is conducted. For example, the monomers that are incorporated as residues in the G-block of the pigment dispersant are generally fed into the reaction vessel prior to those monomers that are incorporated as residues in the W-block, followed by the residues of the Y-block.

During formation of the W- and Y-blocks, if more than one monomer is fed into the reaction vessel at a time, the relative reactivities of the monomers typically determines the order in which they are incorporated into the living polymer chain. Gradient sequences of monomer residues within the W- and Y-blocks can be prepared by controlled radical polymerization, and, in particular, by ATRP methods by (a) varying the ratio of monomers fed to the reaction medium during the course of the polymerization, (b) using a monomer feed containing monomers having different rates of polymerization, or (c) a combination of (a) and (b). Copolymers containing gradient architecture are described in further detail in U.S. Pat. No. 5,807,937, at column 29, line 29 through column 31, line 35.

In certain embodiments, subscripts q and s each have a value of at least 1, such as at least 5 for general formula (I). Also, subscript s often has a value of less than 300, such as less than 100, or less than 50 (for example 20 or less) for general formula (I). The values of subscripts q and s may range between any combination of these values, inclusive of the recited values, for example, s may be a number from 1 to 100. Subscript p may have a value of at least 1, such as at least 5. Subscript p also often has a value of less than 300, such as less than 100 or less than 50 (e.g., 20 or less). The value of subscript p may range between any combination of these values, inclusive of the recited values, for example, p may be a number up to 50. The pigment dispersant often has a number average molecular weight (Mn) of from 250 to 40,000, for example, from 1000 to 30,000 or from 2000 to 20,000, as determined by gel permeation chromatography using polystyrene standards.

Symbol Φ of general formula (I) is, or is derived from, the residue of the initiator used in the preparation of the pigment dispersant by controlled radical polymerization, and is free of the radically transferable group of the initiator. For example, when the pigment dispersant is initiated in the presence of toluene sulfonyl chloride, the symbol Φ, more specifically Φ—is the residue,

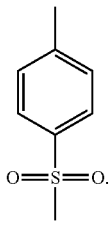

The symbol Φ may also represent a derivative of the residue of the initiator.

In general formula (I), T is or is derived from the radically transferable group of the ATRP initiator. The residue of the radically transferable group may be (a) left on the pigment dispersant, (b) removed or (c) chemically converted to another moiety. The radically transferable group may be removed by substitution with a nucleophilic compound, for example, an alkali metal alkoxylate. When the residue of the radically transferable group is, for example, a cyano group (—CN), it can be converted to an amide group or carboxylic acid group by methods known in the art.

Other suitable dispersants include Solsperse® 32,500 and Solsperse® 5,000 available from Lubrizol Corporation of Wickliffe, Ohio, Disperbyk 2050 available from Byk Additives & Instruments of Wesel, Germany, or Solsperse® 27,000 (used in aqueous systems) available from Lubrizol Corporation.

The pigment dispersant is typically present in the tint in an amount of at least 0.1 percent by weight, such as at least 0.5 percent by weight, or, in some cases, at least 1 percent by weight, based on the total weight of the tint. The dispersant is also often present in the tint in an amount of less than 65 percent by weight, or less than 40 percent by weight, based on the total weight of the tint. The amount of pigment dispersant present in the tint may range between any combination of these values, inclusive of the recited values.

The visibly absorbing infrared transparent pigment is often present in the tint in an amount of at least 0.5 percent by weight, or at least 5 percent by weight, and/or at least 10 percent by weight, based on the total weight of the tint. The visibly absorbing infrared transparent pigment is also typically present in the tint in an amount of less than 90 percent by weight, or less than 50 percent by weight, or less than 20 percent by weight, based on the total weight of the tint. The amount of visibly absorbing infrared transparent pigment present in the tint may range between any combination of these values, inclusive of the recited values.

The visibly absorbing infrared transparent pigment and pigment dispersant are typically together present in the tint in an amount totaling from 20 percent by weight to 80 percent by weight, e.g., from 30 percent by weight to 70 percent by weight or from 40 percent by weight to 60 percent by weight. The percent weights are based on the total combined weight of the visibly absorbing infrared transparent pigment and pigment dispersant. The weight ratio of visibly absorbing infrared transparent pigment to pigment dispersant is typically from 0.1:1 to 100:1, for example, from 0.2:1 to 5:1 or from 0.5:1 to 2:1.

The tint often also comprises at least one organic solvent. Classes of organic solvents that may be present include, but are not limited to, xylene, toluene, alcohols, for example, methanol, ethanol, n-propanol, iso-propanol, n-butanol, sec-butyl alcohol, tert-butyl alcohol, iso-butyl alcohol, furfuryl alcohol and tetrahydrofurfuryl alcohol; ketones or ketoalcohols, for example, acetone, methyl ethyl ketone, and diacetone alcohol; ethers, for example, dimethyl ether and methyl ethyl ether; cyclic ethers, for example, tetrahydrofuran and dioxane; esters, for example, ethyl acetate, ethyl lactate, ethylene carbonate and propylene carbonate; polyhydric alcohols, for example, ethylene glycol, diethylene glycol, triethylene glycol, propylene glycol, tetraethylene glycol, polyethylene glycol, glycerol, 2-methyl-2,4-pentanediol and 1,2,6-hexantriol; hydroxy functional ethers of alkylene glycols, for example, butyl 2-hydroxyethyl ether, hexyl 2-hydroxyethyl ether, methyl 2-hydroxypropyl ether and phenyl 2-hydroxypropyl ether; nitrogen containing cyclic compounds, for example, pyrrolidone, N-methyl-2-pyrrolidone and 1,3-dimethyl-2-imidazolidinone; and sulfur containing compounds such as thioglycol, dimethyl sulfoxide and tetramethylene sulfone.

The tint may be prepared by methods that are known to those of ordinary skill in the art. Such known methods typically involve the use of energy intensive mixing or grinding means, such as ball mills or media mills (e.g., sand mills), as described previously herein.

In certain embodiments of the present invention, the second visibly absorbing infrared transparent pigment is incorporated into the coating composition via a pigment dispersion. As used herein, "pigment dispersion" refers to a composition of pigment in a grinding resin (which may be the same as or different from the film-forming resinous binder or dispersant described earlier with respect to the tint). Because the pigment dispersion may, but does not necessarily need to, include a pigment dispersant (such as those described earlier with respect to the tint), it can be considered as distinct from the previously described tint.

In certain embodiments, such a pigment dispersion has a haze of at least 10%, such as at least 12%, at least 15%, or, in some cases, at least 20%. The pigment dispersion having high haze often contains visibly absorbing infrared transparent pigments that are not nano-sized. Furthermore, such pigment dispersions are often substantially free of visibly absorbing infrared transparent pigments that are nano-sized. By "substantially free" is meant that no more than 10% by weight, such as no more than 5% by weight, or, in some cases, no more than 1% by weight, of the visibly absorbing infrared transparent pigments present in the pigment dispersion are nano-sized. Such tints may be prepared by milling bulk organic pigments with milling media having a particle size of at least 0.5 mm, such as at least 1.0 mm and, in some cases, about 1.2 mm or greater. The pigment dispersions containing pigment particles are often milled in a high energy mill in an organic solvent system, such as butyl acetate, using a grinding resin (such as a film-forming resinous binder and/or pigment dispersant). As a result, in these embodiments, the pigment dispersion having high haze comprises a visibly absorbing infrared transparent pigment having an average primary particle size of at least 200 nanometers, such as at least 300 nanometers or at least 500 nanometers.

The grinding resin is often present in the pigment dispersion in an amount of at least 0.1 percent by weight, such as at least 0.5 percent by weight, or, in some cases, at least 1 percent by weight, based on the total weight of the dispersion. The grinding resin is also often present in the pigment dispersion in an amount of less than 65 percent by weight, or less than 40 percent by weight, based on the total weight of the dispersion. The amount of grinding resin present in the pigment dispersion may range between any combination of these values, inclusive of the recited values.

The second visibly absorbing infrared transparent pigment is often present in the pigment dispersion in an amount of at least 0.5 percent by weight, or at least 5 percent by weight, and/or at least 10 percent by weight, based on the total weight of the pigment dispersion. The visibly absorbing infrared transparent pigment is also typically present in the pigment dispersion in an amount of less than 90 percent by weight, or less than 50 percent by weight, or less than 20 percent by weight, based on the total weight of the dispersion. The amount of visibly absorbing infrared transparent pigment present in the pigment dispersion may range between any combination of these values, inclusive of the recited values.

The second visibly absorbing infrared transparent pigment and grinding resin are typically together present in the pigment dispersion in an amount totaling from 20 percent by weight to 80 percent by weight, e.g., from 30 percent by weight to 70 percent by weight or from 40 percent by weight to 60 percent by weight. The percent weights are based on the total combined weight of the visibly absorbing infrared transparent pigment and grinding resin. The weight ratio of second visibly absorbing infrared transparent pigment to grinding resin is typically from 0.1:1 to 100:1, for example, from 0.2:1 to 5:1 or from 0.5:1 to 2:1.

The pigment dispersion often also comprises at least one organic solvent. Classes of organic solvents that may be present include, but are not limited to, those identified earlier with respect to the tint.

The pigment dispersion may be prepared by methods that are known to those of ordinary skill in the art. Such known methods typically involve the use of energy intensive mixing or grinding means, such as ball mills or media mills (e.g., sand mills), as described above.

In certain embodiments, the weight ratio of first visibly absorbing infrared transparent pigment to second visibly absorbing infrared transparent pigment in the coating composition is 10:1 to 1:10, such as 1:1 to 1:10, or, in some cases, 1:2 to 1:8.

In certain embodiments, the total amount of visibly absorbing infrared transparent pigments in the coating composition is at least 0.1% by weight, such as at least 1% by weight, at least 2% by weight, at least 3% by weight, or, in some cases at least 5% by weight, based on the total solids weight of the coating composition. In certain embodiments, the total amount of visibly absorbing infrared transparent pigments present in the coating composition is no more than 50% by weight, no more than 25% by weight, or, in some cases, no more than 15% by weight or no more than 10% by weight, based on the total solids weight of the coating composition.

In certain embodiments of the present invention, the coating composition is substantially free, or, in some cases, completely free, of carbon black. As used herein, the term "substantially free" when used with reference to the amount of carbon black in a coating composition, means that carbon black is present in the composition in an amount of no more than 0.1 percent by weight, in some cases no more than 0.05 percent by weight, based on the total solids weight of the composition. As used herein, the term "completely free" when used with reference to the amount of carbon black in a coating composition, means that carbon black is not present in the composition at all.

If desired, the coating composition can comprise other optional materials well known in the art of formulated surface coatings, such as plasticizers, anti-oxidants, hindered amine light stabilizers, UV light absorbers and stabilizers, surfactants, flow control agents, thixotropic agents such as bentonite clay, pigments, fillers, organic cosolvents, catalysts, including phosphonic acids and other customary auxiliaries.

In certain embodiments, the coating compositions of the present invention produce a cured coating having a jetness value of at least 240, at least 245, or, in some cases, at least 250. Jetness of a color is a measure of the darkness of the color. The jetness may be quantified by obtaining color data from a spectrophotometer (as described in the Examples herein) and using the following formula as discussed in K. Lippok-Lohmer, Farbe+Lack, 92, p. 1024 (1986):

$$\text{Jetness}=100*(\log_{10}(Xn/X)-\log_{10}(Yn/Y)-\log_{10}(Zn/Z)).$$

Accordingly, a desirable black coating system has a high jetness value. To achieve a high jetness value, the tint(s) and the pigment dispersion(s) are used in combination to yield a dark color to the coating system of the present invention.

It has been discovered that certain of the coating compositions described above are capable of producing cured coatings that exhibit color stability. As used herein, a coating exhibits color stability if the color change of the coating is no more than 1ΔE unit after 3000 hours of QUV durability testing (in accordance with the method described in the Examples) when compared to the color of the coating prior to such testing. The color of a cured coating can also be measured as described in the Examples herein. ΔE is calculated as described in the Examples.

The coating compositions described above are suitable for use in, for example, in multi-component composite coating systems, for example, as a primer coating or as a pigmented base coating composition in a color-plus-clear system, or as a monocoat topcoat. In certain embodiments, however, the foregoing coating compositions are used to form a topcoat in a multi-component composite coating system that further comprises an infrared reflective coating layer deposited beneath at least a portion of the topcoat. As will be appreciated, various other coating layers may be present in accordance with certain embodiments of the present invention, such as, for example, a colorless clearcoat layer which may be deposited over at least a portion of the topcoat. In addition, one or more coating layers may be deposited between the topcoat and the infrared reflective coating layer deposited beneath the topcoat, such as, for example, a selectively strippable coating, as is sometimes used in, for example, aerospace applications. United States Patent Application Publication No. 2006/0106161A1, which is incorporated herein by reference, describes exemplary coatings of this type that comprise an amine-terminated polyamide having a number average molecular weight of from 500 Daltons to 100,000 Daltons. U.S. Pat. No. 6,899,924 at col. 2, line 10 to col. 4, line 65, the cited portion of which being incorporated herein by reference, also describes exemplary coatings of this type that comprise a non-volatile acidic aromatic polar organic compound in free acid or salt form. Moreover, in certain embodiments, one or more coating layers may be deposited between the substrate and the infrared reflective coating layer deposited beneath at least a portion of the topcoat, such as, for example, various corrosion resisting primer layers, including, without limitation, electrodeposited primer layers as are known in the art.

In certain embodiments, the infrared reflective undercoating layer is deposited from a coating composition comprising a film-forming resinous binder (such as any of those described earlier with respect to the coating composition of the present invention) and infrared reflective pigment. As used herein, the term "infrared reflective pigment" refers to a pigment that, when included in a coating composition, provides a cured coating with a reflectance of near-infrared radiation greater than a cured coating deposited in the same manner from the same composition but without the infrared reflective pigment. In some cases, the coating composition comprises the infrared reflective pigment in an amount sufficient to provide a cured coating that has a solar reflectance, measured according to ASTM E903-96 in the wavelength range of 700 to 2500 nanometers, that is at least 10, or, in some cases, at least 15 percentage points higher than a coating deposited in the same manner from the same composition in which the infrared reflective pigment is not present.

The infrared reflective pigment can be colored or essentially colorless, translucent or opaque. As used herein, the twit "essentially colorless" means that the pigment does not have a color, i.e., the absorption curve for the pigment is devoid of absorption peaks in the 400-700 nanometer range and does not present a tint or hue in reflected or transmitted light when viewed under sunlight. A colored infrared reflective pigment is an infrared reflective pigment that is not essentially colorless. Stated differently, a "colored" infrared reflective pigment is one that may be visibly absorbing, as defined below. A "translucent" pigment means that visible light is able to pass through the pigment diffusely. An "opaque" pigment is one that is not translucent. One example of an infrared reflective pigment that can be translucent and essentially colorless (if used in small enough amounts in a coating) is Solarflair 9870 pigment commercially available from Merck KGaA of Darmstadt, Germany. This commercially available pigment is also an example of an interference pigment (described below) that comprises a mica substrate that is coated with titanium dioxide.

Examples of suitable colored and/or opaque infrared-reflective pigments include, for example, any of a variety of metals and metal alloys, inorganic oxides, and interference pigments. Exemplary colors include, for example, white, as is the case with titanium dioxide; brown, as is the case with iron titanium brown spinel; green, as is the case with chromium oxide green; red, as is the case with iron oxide red; yellow, as is the case with chrome titanate yellow and nickel titanate yellow; blue and violet, as is the case with certain $TiO_2$ coated mica flakes.

Suitable metals and metal alloys include, for example, aluminum, chromium, cobalt, iron, copper, manganese, nickel, silver, gold, iron, tin, zinc, bronze, brass, including alloys thereof, such as zinc-copper alloys, zinc-tin alloys, and zinc-aluminum alloys, among others. Some specific examples include nickel antimony titanium, nickel nobium titanium, chrome antimony titanium, chrome niobium, chrome tungsten titanium, chrome iron nickel, chromium iron oxide, chromium oxide, chrome titanate, manganese antimony titanium, manganese ferrite, chromium greenblack, cobalt titanates, chromites, or phosphates, cobalt magnesium, and aluminites, iron oxide, iron cobalt ferrite, iron titanium, zinc ferrite, zinc iron chromite, copper chromite, as well as combinations thereof.

Often, such pigments are in the form of thin flakes. For example, "leafing" aluminum flakes are often suitable. As used herein, the term "thin flake" means that a particle has a ratio of its width to its thickness (termed aspect ratio) that is at least 2 and often falls in the range of 10 to 2,000, such as 3 to 400, or, in some cases, 10 to 200, including 10 to 150. As such, a "thin flake" particle is one that has a substantially flat structure. In some case, such flakes can have a coating deposited thereon, such as is the case with silica coated copper flakes.

In certain embodiments, such thin flake particles have a thickness of less than than 0.05 microns to 10 microns, such as 0.5 to 5 microns. In certain embodiments, such thin flake particles have a maximum width of 10 to 150 microns, such as 10 to 30 microns.

In certain embodiments, the thin flake particles comprise rounded edges and a smooth and flat surface, as opposed to jagged edges. Flakes having angular edges and uneven surfaces are known in the art as "cornflakes". On the other hand, flakes distinguished by more rounded edges, smoother, flatter surfaces are referred to as "silver dollar" flakes.

Moreover, in certain embodiments, the thin flake metal or metal alloy particles comprising rounded edges have a maximum width of no more than 25 micron, such as 10 to 15 micron, when measured according to ISO 1524.

Additional suitable metal pigments include colored metallic pigments, such as those in which a coloring pigment is chemically adsorbed on the surface of a metallic pigment. Such colored metallic pigments are described in U.S. Pat. No. 5,037,745 at col. 2, line 55 to col. 7, line 54, the cited portion of which being incorporated herein by reference. Some such colored metallic pigments are also commercially available and include those available from U.S. Aluminum, Inc., Flemington, N.J., under the tradename FIREFLAKE. In certain embodiments, an infrared transparent pigment, such as the perylene-based pigments described below, can be chemically adsorbed on the surface of the metallic pigment, to provide a dark, sometimes black, colored infrared reflective metallic pigment.

Suitable inorganic oxide containing infrared reflective pigments include, for example, iron oxide, titanium oxide ($TiO_2$) pigment, composite oxide system pigments, titanium oxide-coated mica pigment, iron oxide-coated mica pigment, and zinc oxide pigment, among many others.

In certain embodiments, the infrared reflective pigment exhibits greater reflectivity in the near-infrared wavelength region (700 to 2500 nanometers) than it does in the visible region (400 to 700 nanometers). In certain embodiments, the ratio of reflectivity in the near-infrared region to the reflectivity in the visible region is greater than 1:1, such as at least 2:1, or, in some cases, at least 3:1. Certain interference pigments are examples of such infrared reflective pigments.

As used herein, the term "interference pigment" refers to a pigment having a multi-layer structure having alternating layers of material of different refractive index. Suitable light-interference pigments include, for example, pigments comprising a substrate of e.g. mica, $SiO_2$, $Al_2O_3$, $TiO_2$ or glass that is coated with one or more layers of e.g. titanium dioxide, iron oxide, titanium iron oxide or chrome oxide or combinations thereof, or pigments comprising combinations of metal and metal oxide, such as aluminum coated with layers of iron oxide layers and/or silicon dioxide.

In certain embodiments, the infrared reflective pigment is present in the coating composition from which the infrared reflective layer is deposited in an amount of at least 1% by weight, at least 2% by weight, at least 3% by weight, or, in some cases, at least 5% by weight, at least 6% by weight, or at least 10% by weight, based on the total solids weight of the coating composition. In certain embodiments, the infrared reflective pigment is present in the foregoing coating composition in an amount of no more than 50% by weight, no more than 25% by weight, or, in some cases, no more than 15% by weight, based on the total solids weight of the coating composition. Often, the infrared reflective pigment is present in the foregoing coating composition in an amount greater than 5% by weight, based on the total weight of the coating composition, such as greater than 5% to 15% by weight, based on the total weight of the coating composition.

In certain embodiments, the coating systems of the present invention exhibit a TSR of at least 15%, such as at least 20%, or, in some cases, at least 30%, measured according to ASTM E903-96 in the wavelength range of 700 to 2500 nanometers.

The substrate upon which the coating compositions and coating systems described above may be deposited may take numerous forms and be produced from a variety of materials. In certain embodiments, the substrate takes the form of (i) an automobile component, such as an interior or exterior metal panel, leather or fabric seating areas, plastic components, such as dashboards or steering wheels, and/or other interior vehicle surfaces; (ii) an aerospace component, such as an aircraft exterior panel (which may be metal, such as aluminum or an aluminum alloy, or produced from a polymeric composite material, for example), leather, plastic or fabric seating areas and interior panels, including control panels and the like; (iii) a building component, such as exterior panels and roofing materials; and (iv) industrial components, among others.

Suitable substrate materials include, for example, cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding.

Suitable metallic substrate materials include, but are not limited to, foils, sheets, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable. Such weldable coating compositions are disclosed in, for example, U.S. Pat. Nos. 4,157,924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof.

Non-limiting examples of suitable silicatic substrates are glass, porcelain and ceramics.

Non-limiting examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Non-limiting examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric.

Non-limiting examples of suitable leather substrates are grain leather (e.g. nappa from sheep, goat or cow and boxleather from calf or cow), suede leather (e.g. velours from sheep, goat or calf and hunting leather), split velours (e.g. from cow or calf skin), buckskin and nubuk leather; further also woolen skins and furs (e.g. fur-bearing suede leather). The leather may have been tanned by any conventional tanning method, in particular vegetable, mineral, synthetic or combined tanned (e.g. chrome tanned, zirconyl tanned, aluminum tanned or semi-chrome tanned). If desired, the leather may also be re-tanned; for re-tanning there may be used any tanning agent conventionally employed for re-tanning, e.g. mineral, vegetable or synthetic tanning agents, e.g., chromium, zirconyl or aluminum derivatives, quebracho, chestnut or mimosa extracts, aromatic syntans, polyurethanes, (co)polymers of (meth)acrylic acid compounds or melamine, dicyanodiamide and/or urea/formaldehyde resins.

Non-limiting examples of suitable compressible substrates include foam substrates, polymeric bladders filled with liquid, polymeric bladders filled with air and/or gas, and/or polymeric bladders filled with plasma. As used herein the term "foam substrate" means a polymeric or natural material that comprises a open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include, but are not limited to, polystyrene foams, polymethacrylimide foams, polyvinylchloride foams, polyurethane foams, polypropylene foams, polyethylene foams, and polyolefinic foams. Example polyolefinic foams include, for example, polypropylene foams, polyethylene foams and/or ethylene vinyl acetate (EVA) foam. EVA foam can include flat sheets or slabs or molded EVA forms, such as shoe midsoles. Different types of EVA foam can have different types of surface porosity. Molded EVA can comprise a dense surface or "skin", whereas flat sheets or slabs can exhibit a porous surface.

The coating compositions from which each of the coatings described above is deposited can be applied to a substrate by any of a variety of methods including dipping or immersion, spraying, intermittent spraying, dipping followed by spraying, spraying followed by dipping, brushing, or roll-coating, among other methods. In certain embodiments, however, the coating compositions are applied by spraying and, accordingly, such compositions often have a viscosity that is suitable for application by spraying at ambient conditions.

After application of a coating composition to the substrate, it is allowed to coalesce to form a substantially continuous film on the substrate. Typically, the film thickness will be 0.01 to 20 mils (about 0.25 to 508 microns), such as 0.01 to 5 mils (0.25 to 127 microns), or, in some cases, 0.1 to 2 mils (2.54 to 50.8 microns) in thickness. A method of forming a coating film according to the present invention, therefore, comprises applying a coating composition to the surface of a substrate or article to be coated, coalescing the coating composition to form a substantially continuous film and then curing the thus-obtained coating. In certain embodiments, the curing of these coatings can comprise a flash at ambient or elevated temperatures followed by a thermal bake. In some embodiments, curing can occur at ambient temperature of 20° C. to 175° C., for example.

Illustrating the invention are the following examples that are not to be considered as limiting the invention to their details. All parts and percentages in the examples, as well as throughout the specification, are by weight unless otherwise indicated.

EXAMPLES

Examples 1-7

Preparation of Pigment Dispersions

Examples 1-5 were processed using methods and equipment to make low haze tints. Examples 6 and 7 were prepared as pigment dispersions having higher haze.

Example 1

Paliogen Black L 0086 was milled and dispersed in the mill base formula shown in Table 1, on a QM-1 QMAX Supermill (Premier Mill, SPX Process Equipment) using 0.5 mm YTZ® milling media (Tosoh Corporation) to the final % haze value shown in Table 2.

Example 2

Lumogen Black FK 4280 was milled and dispersed in the mill base formula shown in Table 1, on a QM-1 QMAX Supermill (Premier Mill, SPX Process Equipment) using 0.5 mm YTZ® milling media (Tosoh Corporation) to the final % haze value shown in Table 2.

Example 3

Pigment Yellow 139 (PY 139) was milled and dispersed in the mill base formula shown in Table 1, on a QM-1 QMAX Supermill (Premier Mill, SPX Process Equipment) using 0.3 mm YTZ® milling media (Tosoh Corporation) to the final % haze value shown in Table 2.

Example 4

Pigment Red 179 (PR 179) was milled and dispersed using the mill base formula shown in Table 1, on a Drais Advantis® mill (Baler AG) using 0.3 mm YTZ® milling media (Tosoh Corporation) to the final % haze value shown in Table 2.

Example 5

Pigment Blue 15:3 (PB 15:3) was milled and dispersed in the mill base formula shown in Table 1, on a QM-1 QMAX Supermill (Premier Mill, SPX Process Equipment) using 0.3 mm YTZ® milling media (Tosoh Corporation) to the final % haze value shown in Table 2.

Example 6

Paliogen Black L 0086 was milled and dispersed in the mill base formula shown in Table 1, on a QM-1 HM Mill (Premier Mill, SPX Process Equipment) using 1.2-1.7 mm Zirconox® milling media (Jyoti Ceramic Industries Pvt. Ltd.) to the final % haze value shown in Table 2.

Example 7

Lumogen Black FK 4280 was milled and dispersed in the mill base formula shown in Table 1, on a QM-1 QMAX Supermill (Premier Mill, SPX Process Equipment) using 0.5 mm YTZ® milling media (Tosoh Corporation) to the final % haze value shown in Table 2.

TABLE 1

|  | Weight % of Tint Formula | | | | | | |
| --- | --- | --- | --- | --- | --- | --- | --- |
| Ingredient | Ex. 1 | Ex. 2 | Ex. 3 | Ex. 4 | Ex. 5 | Ex. 6 | Ex. 7 |
| Dispersant Resin[1] | 29.35 | 36.42 | 28.92 | 25.46 |  | 27.28 | 27.63 |
| Solsperse ® 32500[2] |  |  |  |  | 52.17 |  |  |
| Solsperse ® 5000[3] |  |  |  |  | 2.06 |  |  |
| N-butyl acetate |  |  | 60.97 | 64.35 | 30.51 |  |  |
| Methyl ether propylene glycol acetate[4] | 55.98 | 48.67 |  |  |  | 56.82 | 50.72 |
| Paliogen ® Black L 0086[5] | 14.67 |  |  |  |  | 15.90 |  |
| Lumogen ® Black FK 4280[5] |  | 14.91 |  |  |  |  | 21.65 |
| Paliotol ® Yellow L 2140 HD[5] |  |  | 10.11 |  |  |  |  |
| Irgazin ® Red 379[5] |  |  |  | 10.19 |  |  |  |
| Heliogen ® Blue L 7081 D[5] |  |  |  |  | 15.26 |  |  |

[1]A polymeric pigment dispersant prepared in a manner consistent with Synthesis Example A of U.S. patent application 2008/0188610 A1.
[2]Available commercially from Lubrizol Corporation.
[3]Available commercially from Lubrizol Corporation.
[4]Available commercially from Dow Chemical Company as Dowanol ™ PMA
[5]Available commercially from BASF Corporation.

TABLE 2

|  | Ex. 1 | Ex. 2 | Ex. 3 | Ex. 4 | Ex. 5 | Ex. 6 | Ex. 7 |
| --- | --- | --- | --- | --- | --- | --- | --- |
| Weight % Non-Volatile | 31.40 | 35.67 | 39.03 | 35.65 | 38.18 | 31.45 | 37.40 |
| Weight % Pigment | 14.67 | 14.91 | 10.11 | 10.19 | 15.26 | 15.90 | 21.65 |
| % Haze* | 7.93 | 1.6 | 0.4 | 0.1 | <0.45 | 20.8 | 9.8 |

*For analysis, the final tints were diluted with solvent. The % haze was measured with an X-Rite 8400 spectrophotometer in transmittance mode with a 500 micron path-length cell. The % haze reported here is at a transmittance of approximately 17.5% at the wavelength of maximum absorbance.

Examples 8-12

Coating Compositions

Coating compositions were prepared using the ingredients and amounts listed in Table 3. The coatings were formulated such that the total weight % of pigment in the total non-volatiles of the paint yielded a black coating that was visibly hiding when drawn down over a black and white hiding chart such as a brushout card PA-2857 (available from BYK Gardner). Components 1, 2 and 3 were mixed together by stirring. Components 4 and 5 were premixed and added to the other components just prior to application.

TABLE 3

| Component | Description | Weight % of Coating Formula | | | | |
|---|---|---|---|---|---|---|
| | | Ex. 8 | Ex. 9 | Ex. 10 | Ex. 11 | Ex. 12 |
| 1.a | Example 6 | 16.98 | | | | 8.84 |
| 1.b | Example 1 | | 17.34 | | | |
| 1.c | Example 7 | | | 9.00 | | |
| 1.d | Example 2 | | | | 13.35 | 2.32 |
| 2 | Ethyl 3-ethoxy-propanoate[1] | 1.46 | 6.70 | 6.08 | 4.09 | 10.47 |
| 3 | Polyol Solution[2] | 37.69 | 34.85 | 39.88 | 38.12 | 36.56 |
| 4 | Isocyanate Solution[3] | 32.75 | 30.82 | 33.26 | 33.18 | 31.02 |
| 5 | Thinner[4] | 11.13 | 10.29 | 11.78 | 11.26 | 10.80 |

[1]Available commercially from Eastman Chemical Company as Eastman EEP.
[2]Available commercially from PPG Industries as Desothane ® HS CA8000/B900A Clear Topcoat.
[3]Available commercially from PPG Industries as Desothane ® HS CA8000B Activator.
[4]Available commercially from PPG Industries as Desothane ® HS CA8000C Thinner.

The coating compositions of Examples 8-12 were spray applied to a dry film thickness of approximately 2 mils using an HVLP type spray gun onto coated 2024 T3 plain aluminum test panels. The coating system on the panels, prior to application of the Example compositions, consisted of the following layers: (1) 0.6-1.2 mils Desoprime™ CA7501 non-chromated epoxy primer commercially available from PPG Industries; (2) 0.3-0.5 mils P565-4010 Intermediate Coat, a selectively strippable layer commercially available from PPG Industries; (3) 2.0-3.0 mils Desothane®HS CA8000 B70846 Gloss White topcoat commercially available from PPG Industries.

The test panels with Examples 8-12 were then allowed to cure at ambient conditions for 1 week. Color was measured on the panels using both a BYK-mac multi-angle spectrophotometer (BYK Instruments) to determine jetness and a GretagMacBeth™ Color-Eye® 2145 (X-Rite Incorporated) to determine an initial CIELAB color using D65 illumination and 10° observer. They were also measured for % Total Solar Reflectance (% TSR) using a LAMBDA 9 ultraviolet/visible/near infrared spectrometer (PerkinElmer Inc.). A portion of the panel was then cut off and placed into a model QUV/se accelerated weathering cabinet (Q-Lab Corporation) for durability testing using the following cycle conditions: UVB-313 for 8 hours at 0.66 W/m² irradiance held at 70° C., followed by 4 hours condensing humidity at 50° C. After approximately 3000 hours of exposure, the color was again measured using the Color-Eye® and compared to the initial CIELAB results. The jetness, % TSR and color difference values for L*, a* and b* after QUV testing are summarized in Table 4.

TABLE 4

| | | | Color Change After 3000 Hours Durability Testing in a QUV vs. Initial Color | | | |
|---|---|---|---|---|---|---|
| Example | Jetness[1] | % TSR[2] | ΔL* | Δa* | Δb* | ΔE – Total Color Change[3] |
| 8 | 221 | 41.0 | 0.60 | 0.06 | −0.50 | 0.78 |
| 9 | 258 | 41.6 | 0.97 | 0.02 | −0.08 | 0.97 |
| 10 | 222 | 35.4 | 1.02 | −0.05 | 0.34 | 1.08 |
| 11 | 256 | 35.8 | 1.22 | −0.74 | 0.39 | 1.48 |
| 12 | 247 | 39.3 | 0.36 | 0.05 | −0.13 | 0.39 |

[1]Jetness was calculated from the L*a*b* color data collected at 75° on the BYK-mac using the following formula: Jetness = 100 * (log$_{10}$(X$_n$/X) + log$_{10}$(Y$_n$/Y) − log$_{10}$(Z$_n$/Z), as discussed in K. Lippok-Lohmer, Farbe und Lack, 92, p.1024 (1986).
[2]% TSR was calculated using ASTM E 903 and ASTM E 891.
[3]ΔE = ((ΔL*)² + (Δa*)² + (Δb*)²)$^{1/2}$ Example 12 illustrates the benefits of the present invention. Example 12 had a total of 4 weight % of pigment in the non-volatile portion of the coating. 85% by weight of the total pigment came from the higher haze pigment dispersion of Example 6 while 15% by weight of the total pigment came from the low haze tint of Example 2. By blending these two pigment dispersions, it was possible to achieve a coating that used a high haze pigment dispersion with a visibly absorbing infrared transparent pigment as the main base to produce a coating with higher Jetness, less total color change in durability testing and that hid the underlying coating at a lower pigment concentration by supplementing the pigment dispersion with a relatively small amount of the low haze tint. Observation of the initial sprayed test panels also illustrated another important benefit of the blend. While appearing black at a high enough concentration and film thickness, Paliogen L 0086 is actually a green pigment. Similarly, while appearing black at a high enough concentration and film thickness, Lumogen FK 4280 is actually a violet pigment. Areas of low film thickness and edges of test panels therefore appear green and violet instead of black. However, by blending the tints, the coating had close to neutral values for a* and b* color values, so the edges and thin film areas appeared black. This is demonstrated in Table 5 where Example 12 had a* and b* values close to zero as measured on a GretagMacBeth™ Color-Eye® 2145 (X-Rite Incorporated) using D65 illumination and 10° observer.

TABLE 5

| Example | Initial L* | Initial a* | Initial b* |
|---|---|---|---|
| 8 | 3.14 | −0.16 | 0.24 |
| 9 | 2.68 | −0.56 | −0.31 |
| 10 | 3.10 | 0.61 | 1.61 |
| 11 | 1.98 | 0.96 | −0.35 |
| 12 | 2.50 | 0.02 | −0.07 |

Examples 13-18

Coating Compositions

Coating compositions were prepared using the ingredients and amounts listed in Table 6. The coatings were formulated such that the total weight % of pigment in the total non-volatiles of the paint yielded a black coating that was visibly hiding when drawn down over a black and white hiding chart such as a brushout card PA-2857 (available from BYK Gardner). Components 1, 2 and 3 were mixed together by stirring. Components 4 and 5 were premixed and added to the other components just prior to application.

TABLE 6

| Component | Description | Weight % of Coating Formula | | | | | |
|---|---|---|---|---|---|---|---|
| | | Ex. 13 | Ex. 14 | Ex. 15 | Ex. 16 | Ex. 17 | Ex. 18 |
| 1.a | Example 6 | 8.30 | 5.52 | 2.76 | 8.30 | 5.53 | 2.77 |
| 1.b | Example 7 | 2.78 | 5.55 | 8.31 | | | |
| 1.c | Example 2 | | | | 4.12 | 8.28 | 12.40 |
| 2 | Ethyl 3-ethoxypropanoate[1] | 5.24 | 5.24 | 5.24 | 4.60 | 3.98 | 3.30 |
| 3 | Polyol Solution[2] | 39.14 | 39.15 | 39.15 | 38.63 | 38.07 | 37.54 |
| 4 | Isocyanate Solution[3] | 32.97 | 32.98 | 32.98 | 32.94 | 32.90 | 32.91 |
| 5 | Thinner[4] | 11.56 | 11.56 | 11.56 | 11.41 | 11.24 | 11.09 |

[1]Available commercially from Eastman Chemical Company as Eastman EEP.
[2]Available commercially from PPG Industries as Desothane ® HS CA8000/B900A Clear Topcoat.
[3]Available commercially from PPG Industries as Desothane ® HS CA8000B Activator.
[4]Available commercially from PPG Industries as Desothane ® CA8000C Thinner.

Examples 13-18 along with examples 8, 10 and 11 were applied by draw down using a #78 wet film applicator rod (available from Paul N. Gardner Company, Inc.) over a black and white brushout chart PA-2857 (available from BYK Gardner). The color was measured over the white portion of the chart using a BYK-mac multi-angle spectrophotometer with the resulting jetness values reported in Table 7.

TABLE 7

| | Example 8 | Example 13 | Example 14 | Example 15 | Example 10 |
|---|---|---|---|---|---|
| Jetness* | 218 | 230 | 228 | 224 | 218 |

| | Example 8 | Example 16 | Example 17 | Example 18 | Example 11 |
|---|---|---|---|---|---|
| Jetness* | 218 | 246 | 251 | 251 | 244 |

*Jetness was calculated from the L*a*b* color data collected at 75° on the BYK-mac using the following formula: Jetness = 100 * ($\log_{10}(X_n/X) + \log_{10}(Y_n/Y) - \log_{10}(Z_n/Z)$), as discussed in K. Lippok-Lohmer, Farbe und Lack, 92, p.1024 (1986). Note that the values for Examples 8, 10 and 11 differ slightly from Table 4 due to variability in the test.

Examples 8, 13, 14, 15 and 10 illustrate the effect of blending a conventional Paliogen L 0086 pigment dispersion with a conventional Lumogen FK 4280 pigment dispersion where the weight ratio of the pigments were 3:1 for Example 13; 1:1 for Example 14 and 1:3 for Example 15. Examples 8, 16, 17, 18 and 11 show the same comparison using the conventional Paliogen L 0086 pigment dispersion with a low haze tint of Lumogen FK 4280. While both comparisons show that there is an advantage in higher jetness numbers when the two pigments are blended, jetness tends to be best when >250. It was possible to reach high jetness values by adding the low haze Lumogen FK 4280 tint to a conventional Paliogen L 0086 pigment dispersion. While only jetness numbers were measured, it is expected that the results for % TSR, color durability and color in areas of low film thickness would be similar to the examples in Tables 4 and 5. In particular, it is expected that the color durability of Examples 16-18 would be superior to the color durability of Example 11.

Examples 19-24

Coating Compositions

Coating compositions were prepared using the ingredients and amounts listed in Table 8. The coatings were formulated such that the total weight % of pigment in the total non-volatiles of the paint yielded a black coating that was visibly hiding when drawn down over a black and white hiding chart such as a brushout card PA-2857 (available from BYK Gardner), Components 1, 2 and 3 were mixed together by stirring. Components 4 and 5 were premixed and added to the other components just prior to application.

TABLE 8

| Component | Description | Weight % of Coating Formula | | | | | |
|---|---|---|---|---|---|---|---|
| | | Ex. 19 | Ex. 20 | Ex. 21 | Ex. 22 | Ex. 23 | Ex. 24 |
| 1.a | Example 1 | | | | | 6.74 | 12.28 |
| 1.b | Example 3 | 1.01 | 1.87 | 2.86 | | | |
| 1.c | Example 4 | 2.00 | 3.70 | 5.66 | | | |
| 1.d | Example 5 | 4.23 | 7.82 | 11.97 | | | |
| 1.e | Example 6 | 11.12 | 5.96 | | | | |
| 1.f | UCD 5628HS PY139 Dispersion[1] | | | | 0.65 | 0.42 | 0.22 |
| 1.g | UCD 6436HS PR179 Dispersion[2] | | | | 2.07 | 1.31 | 0.69 |
| 1.h | UCD 4820V PB15:3 Dispersion[3] | | | | 11.52 | 7.32 | 3.88 |
| 3 | Polyol Solution[4] | 38.00 | 37.54 | 37.01 | 39.92 | 39.20 | 38.60 |
| 4 | Isocyanate Solution[5] | 32.41 | 32.02 | 31.57 | 34.05 | 33.43 | 32.92 |
| 5 | Thinner[6] | 11.23 | 11.09 | 10.93 | 11.79 | 11.58 | 11.40 |

[1]Available commercially from Plasticolors, Inc.
[2]Available commercially from Plasticolors, Inc.
[3]Available commercially from Plasticolors, Inc.
[4]Available commercially from PPG Industries as Desothane ® HS CA8000/B900A Clear Topcoat.
[5]Available commercially from PPG Industries as Desothane ® HS CA8000B Activator.
[6]Available commercially from PPG Industries as Desothane ® HS CA8000C Thinner.

Examples 19-24 along with examples 8 and 9 were applied by draw down using a #78 wet film applicator rod (available from Paul N. Gardner Company, Inc.) over a black and white brushout chart PA-2857 (available from BYK Gardner). The color was measured over the white portion of the chart using a BYK-mac multi-angle spectrophotometer with the resulting jetness values reported in Table 9.

TABLE 9

| | Example 8 | Example 19 | Example 20 | Example 21 |
|---|---|---|---|---|
| Jetness* | 218 | 257 | 264 | 269 |

| | Example 22 | Example 23 | Example 24 | Example 9 |
|---|---|---|---|---|
| Jetness* | 231 | 233 | 241 | 258 |

*Jetness was calculated from the L*a*b* color data collected at 75° on the BYK-mac using the following formula: Jetness = 100 * ($\log_{10}(X_n/X) + \log_{10}(Y_n/Y) - \log_{10}(Z_n/Z)$), as discussed in K. Lippok-Lohmer, Farbe und Lack, 92, p.1024 (1986).

Examples 8, 19, 20, and 21 and Examples 22, 23, 24 and 9 demonstrated that the low haze tint pigment dispersion need not be limited to a black perylene pigment. Example 21 was a blend of low haze tints combined to provide a pigment mixture consisting of 10.7% by weight Pigment Yellow 139, 21.4% by weight Pigment Red 179 and 67.9% by weight Pigment Blue 15:3, based on total pigment weight, at a total pigment concentration of 4.5% by weight of the total amount of non-volatiles in the paint to make a black coating. Example 19 was a blend of a high haze Paliogen L 0086 pigment dispersion at 65% by weight of the pigment with the low haze "combination" black at 35% by weight, while Example 20 was a blend of 35% by weight of the high haze Paliogen L 0086 pigment dispersion with 65% y weight of the low haze "combination" of tints. Similarly, Example 22 was made by mixing commercially available high haze conventional dispersions consisting of 10.7% by weight Pigment Yellow 139, 21.4% by weight Pigment Red 179 and 67.9% by weight Pigment Blue 15:3, based on total pigment weight. Examples 23 and 24 blend the high haze "combination" black with the low haze Paliogen L 0086 tint at weight ratios of 65/35 and 35/65 respectively. In both the case of the low haze "combination" black and the low haze Paliogen L 0086, the intermediate blends represented by Examples 19, 21, 23, and 24 demonstrated higher jetness values than the high haze starting formulations Examples 8 and 22. Again, while only jetness numbers were measured, it is expected that results for % TSR, color durability and color in areas of low film thickness would be similar to the examples in Tables 4 and 5. In particular, it is expected that the color durability of Examples 19 and 20 would be superior to the color durability of Examples 8 and 21. It is also expected that the color durability of Examples 22-24 would be similar and would be superior to the color durability of Example 9.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A coating composition comprising:
   (a) film-forming resinous binder;
   (b) a first visibly absorbing infrared transparent low haze pigment,
   wherein the first visibly absorbing infrared transparent low haze pigment has an average primary particle size of no more than 100 nanometers; and
   (c) a second visibly absorbing infrared transparent high haze pigment different from the first visibly absorbing infrared transparent low haze pigment,
   wherein the second visibly absorbing infrared transparent high haze pigment has an average primary particle size of at least 200 nanometers, and
   wherein a cured coating deposited from the composition:
   (i) has a jetness of at least 240, and
   (ii) exhibits a color change of no more than 1ΔE unit after 3000 hours of QUV durability testing.

2. The coating composition of claim 1, wherein the jetness value is at least 250.

3. The coating composition of claim 1, wherein the first visibly absorbing infrared transparent low haze pigment and the second visibly absorbing infrared transparent high haze pigment both comprise a perylene.

4. The coating composition of claim 1, wherein a weight ratio of the first visibly absorbing infrared transparent low haze pigment to the second visibly absorbing infrared transparent high haze pigment is from 10:1 to 1:10.

5. The coating composition of claim 4, wherein the weight ratio is 1:2 to 1:8.

6. A method of using the coating composition of claim 1, comprising depositing the coating composition over at least a portion of an infrared reflective coating layer comprising a film-forming resinous binder and infrared reflective pigment.

7. A coating composition comprising:
   (a) a tint having a haze of no more than 5% and comprising a first visibly absorbing infrared transparent low haze pigment,
   wherein the first visibly absorbing infrared transparent low haze pigment has an average primary particle size of no more than 100 nanometers; and
   (b) a pigment dispersion comprising a second visibly absorbing infrared transparent high haze pigment different from the first visibly absorbing infrared transparent low haze pigment,
   wherein the second visibly absorbing infrared transparent high haze pigment has an average primary particle size of at least 200 nanometers,
   wherein the pigment dispersion has a haze of at least 10%.

8. The coating composition of claim 7, wherein the composition produces a coating having a jetness value of at least 240.

9. The coating composition of claim 7, wherein the tint has a haze of no more than 3%.

10. The coating composition of claim 7, wherein the tint has a haze of no more than 1%.

11. The coating composition of claim 7, wherein the pigment dispersion has a haze of at least 15%.

12. The coating composition of claim 7, wherein the pigment dispersion has a haze of at least 20%.

13. The coating composition of claim 7, wherein the tint and the pigment dispersion both comprise a visibly absorbing infrared transparent low haze pigment and high haze pigment comprising a perylene.

14. The coating composition of claim 7, wherein the tint is substantially free of visibly absorbing infrared transparent low haze pigment having an average primary particle size of more than 100 nanometers.

15. The coating composition of claim 7, wherein the pigment dispersion is substantially free of visibly absorbing infrared transparent high haze pigments having an average primary particle size of no more than 100 nanometers.

16. The coating composition of claim 7, wherein a weight ratio of the first visibly absorbing infrared transparent low haze pigment and the second visibly absorbing infrared transparent high haze pigment in the coating composition is from 10:1 to 1:10.

17. The coating composition of claim 16, wherein the weight ratio is 1:2 to 1:8.

18. A method of using the coating composition of claim 7, comprising depositing the coating composition over at least a portion of an infrared reflective coating layer comprising a film-forming resinous binder and infrared reflective pigment.

* * * * *